(12) United States Patent
Wells et al.

(10) Patent No.: US 8,244,402 B2
(45) Date of Patent: Aug. 14, 2012

(54) VISUAL PERCEPTION SYSTEM AND METHOD FOR A HUMANOID ROBOT

(75) Inventors: James W. Wells, Rochester Hills, MI (US); Neil David Mc Kay, Chelsea, MI (US); Suhas E. Chelian, Los Angeles, CA (US); Douglas Martin Linn, White Lake, MI (US); Charles W. Wampler, II, Birmingham, MI (US); Lyndon Bridgwater, Houston, TX (US)

(73) Assignees: GM Global Technology Operations LLC, Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 414 days.

(21) Appl. No.: 12/564,074

(22) Filed: Sep. 22, 2009

(65) Prior Publication Data

US 2011/0071675 A1 Mar. 24, 2011

(51) Int. Cl.
*G05B 19/04* (2006.01)

(52) U.S. Cl. ........ 700/250; 700/245; 700/246; 700/247; 700/252; 700/257; 446/95; 446/284; 446/327; 446/465; 446/473; 318/568.11; 318/568.13; 901/1; 901/30; 600/38; 706/44; 706/45

(58) Field of Classification Search ............... 701/4, 9, 701/14, 200, 207, 208, 210, 211, 213, 216, 701/217, 214, 301; 340/970, 971, 979, 980, 340/988, 990, 995.18; 342/33, 352, 357.31, 342/457, 357.44, 357.52; 244/3.2, 3.15; 73/178 T, 178 R; 707/999.104, E17.018; 600/424, 38; 700/245, 246, 247, 250, 252, 700/257, 258, 900; 446/95, 284, 327, 465, 446/473, 487; 318/568.11, 568.13; 901/1, 901/30; 706/44, 45; 414/402; 379/419
See application file for complete search history.

(56) References Cited

U.S. PATENT DOCUMENTS 5,405,337 A * 4/1995 Maynard ................. 604/531
(Continued)

OTHER PUBLICATIONS

Hasunuma et al., Development of Teleoperation Master System with a Kinesthetic Sensation of Presence, 1999, Internet, p. 1-7.*

(Continued)

*Primary Examiner* — James P Trammell
*Assistant Examiner* — Mcdieunel Marc
(74) *Attorney, Agent, or Firm* — Quinn Law Group, PLLC (57) ABSTRACT

A robotic system includes a humanoid robot with robotic joints each moveable using an actuator(s), and a distributed controller for controlling the movement of each of the robotic joints. The controller includes a visual perception module (VPM) for visually identifying and tracking an object in the field of view of the robot under threshold lighting conditions. The VPM includes optical devices for collecting an image of the object, a positional extraction device, and a host machine having an algorithm for processing the image and positional information. The algorithm visually identifies and tracks the object, and automatically adapts an exposure time of the optical devices to prevent feature data loss of the image under the threshold lighting conditions. A method of identifying and tracking the object includes collecting the image, extracting positional information of the object, and automatically adapting the exposure time to thereby prevent feature data loss of the image.

15 Claims, 5 Drawing Sheets

U.S. PATENT DOCUMENTS

| | | | | |
|---|---|---|---|---|
| 6,317,652 B1 * | 11/2001 | Osada | ............................ | 700/245 |
| 6,587,835 B1 * | 7/2003 | Treyz et al. | .................. | 705/14.64 |
| 7,127,326 B2 * | 10/2006 | Lewis | ............................ | 700/258 |
| 7,206,753 B2 * | 4/2007 | Bancroft et al. | .............. | 705/7.29 |
| 7,269,477 B2 * | 9/2007 | Fukuchi et al. | ................. | 700/245 |
| 7,302,312 B2 * | 11/2007 | Murray et al. | .................. | 700/250 |
| 7,428,997 B2 * | 9/2008 | Wiklof et al. | ............. | 235/462.42 |
| 7,438,451 B2 * | 10/2008 | Daniel | ........................... | 362/489 |
| 7,539,557 B2 * | 5/2009 | Yamauchi | ..................... | 700/245 |
| 8,014,047 B2 * | 9/2011 | Machida | ........................ | 358/498 |

OTHER PUBLICATIONS

Qing et al., Active Self-Calibration of Robotic Eyes and Hand-Eye Relationships with Model Identification, 1998, IEEE, p. 158-166.*
Zhuang et al., Simultaneous Calibration of a Robot and a Hand-Mounted Camera, 1993, IEEE, p. 149-154.*
Meng et al., Self-Calibration of Camera-Equipped Robot Manipulators, 2001, Internet, p. 909-921.*
Maxwell et al., Alfred: The Robot Waiter Who Remembers You, 1999, Internet, p. 1-12.*
http://robotics.nasa.gov/courses/fall2002/event/oct1/NASA_Robotics_20021001.htm.

* cited by examiner

VISUAL PERCEPTION SYSTEM AND METHOD FOR A HUMANOID ROBOT

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to the control of a humanoid robot, and in particular to a system and a method for automatically finding, tracking, and measuring various features and/or objects in the field of view of the humanoid robot.

BACKGROUND OF THE INVENTION

Robots are automated or autonomous devices that are able to manipulate objects using a series of rigid links, which in turn are interconnected via articulations or motor-driven robotic joints. Each joint in a typical robot represents an independent control variable, also referred to as a degree of freedom (DOF). End-effectors are the particular links used for performing a task at hand, e.g., grasping a work tool or other object. Therefore, precise motion control of a robot may be organized by the level of task specification: object level control, i.e., the ability to control the behavior of an object held in a single or cooperative grasp of a robot, end-effector control, and joint level control. Collectively, the various control levels cooperate to achieve the required robotic mobility, dexterity, and work task-related functionality.

Humanoid robots in particular have an approximately human structure, function, and/or appearance, whether a full body, a torso, and/or one or more appendages, with the required structural complexity of the humanoid robot being largely dependent upon the nature of the work task being performed. The use of humanoid robots may be preferred where direct interaction is required with objects, tools, or systems that are specifically intended for human use. Due to the wide spectrum of potential work tasks that may be expected of a humanoid robot, different control modes may be simultaneously required. For example, precise control must be applied within the different control spaces noted above, as well as over an applied torque, force, or resultant joint motion.

Conventional robotic systems may rely on task-specific end-effectors, part fixtures, and jigs to implement an assembly process. In some cases, machine vision systems may be implemented and tuned to locate a specific part, and/or to confirm completion of an assembly task or a sequential step thereof Setting up such a system may be relatively time consuming, and often requires extensive calibration, robot programming, and machine-level code compilation. State of the art machine vision systems may employ two-dimensional or three-dimensional vision systems and structured/engineered lighting techniques. The resulting assembly system may tend to be specific to just one set of like tasks and work conditions. Likewise, the set-up, commissioning, and support of the robot may be relatively challenging and time-consuming, with fixturing, tooling, and/or various material handling equipment normally required, thus resulting in added engineering, installation, and other expenses.

SUMMARY OF THE INVENTION

Accordingly, a flexible visual perception system and method are provided herein allowing a humanoid robot having multiple DOF, e.g., the over 42 DOF of a particular humanoid robot described herein, to automatically find, track, and measure a plurality of features and/or objects in the field of view of the robot, i.e., in the field of view of an array of different optical, laser, and/or infrared sensors thereof. The humanoid robot includes multiple robotic joints each being moveable through one or more DOF using at least one joint motor or other joint-level actuator(s), and may also include torque, position, and/or other sensors adapted for measuring any required control and feedback data within the robotic joints and other integrated system components.

A distributed controller may be adapted for controlling the various robotic joints and other integrated system components needed for executing a particular sequence, including a visual perception module (VPM) as described below, by communicating control data over multiple high-speed communication networks. The controller may include a command-level controller for transmitting a control signal commanding the performance of an automated or autonomous task or step by the robot, multiple embedded joint and system-level controllers each directly controlling the operation of a respective integrated system component, e.g., one of the robotic joints, and a joint coordination-level controller for coordinating control of the various integrated system components used for a particular sequence in response to the control signal.

A portion of the distributed controller, i.e., the VPM, provides the humanoid robot with precise visual perception capability via a set of sensors, e.g., optical sensors such as machine vision high-resolution cameras, general purpose and/or ambient lighting, range finding sensors such as a short range infrared range imaging device, and/or laser devices for extracting positional data of the object, and one or more image processing hardware/software devices, i.e., a respective host machine and image processing algorithm. Automation is enabled that significantly reduces the reliance of the humanoid robot on fixturing and/or other supporting mechanical structure for its basic operation, allowing tasks to be completed using tools and infrastructure similar to those used for a completely manual process.

The controller includes the VPM, which may include a host machine, server, or other suitable processing device, as well as an image processing algorithm embodying the method of the present invention, and a plurality of sensors configured for collecting the required image and/or range image data that is ultimately processed using the host machine. The VPM may also include an auxiliary lighting system enabling automation without the need for application-specific engineered lighting systems of the type known in the art. The VPM, by executing the algorithm as set forth herein, provides precise object/feature location and guidance in challenging threshold ambient lighting conditions, i.e., threshold low-contrast black-on-black or white-on-white feature conditions, for a range of parts that might be encountered in conducting a particular automated or autonomous task.

The algorithm automatically adapts the exposure time of a set of optical cameras to prevent feature data loss in threshold dark or light areas of a collected image. As noted above, the algorithm also provides black-on-black or white-on-white feature finding capability of like-contrast surfaces under the threshold ambient lighting conditions. This allows for the optimization of the sensors luminance dynamic range based on the need for the application to discern very dark or light features in the field of view. Additionally, the VPM may be used to "teach" or "show" the humanoid robot new automated task sequences, e.g., by showing the robot various data points, parts, poses, features in the environment, calibration artifacts, and/or sequential paths within a particular work area or work envelope. These and other image processing capabilities are set forth in further detail herein.

In particular, a robotic system is provided having a humanoid robot with a plurality of robotic joints each being moveable using at least one of a plurality of actuators. The system also includes a visual perception module (VPM). The VPM is adapted to visually identify and track an object in the field of view of the robot under threshold ambient lighting conditions, and includes a plurality of optical devices adapted for collecting an image of the object, at least one position extraction device, such as a laser device and a range imaging device adapted for extracting positional information of the object, a host machine, and an image-processing algorithm. The algorithm is executed via the host machine to automatically adapt an exposure time of the optical devices to prevent feature data loss of a captured image of the object under the threshold ambient lighting conditions, both for very dark or very light features of interest at the extremes of the luminance range of the sensor.

A method is also provided for identifying and tracking an object in the field of view of the humanoid robot under the same threshold ambient lighting conditions. The method includes using optical devices to collect an image of the object, using either or both of the laser and radar-based range imaging devices to extract positional information of the object, and processing the image and positional information using a host machine. The method also includes using the host machine to process the image and positional information using an image processing algorithm, to automatically adapt an exposure time of the optical devices, and to thereby prevent feature data loss of the image under the threshold ambient lighting conditions.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
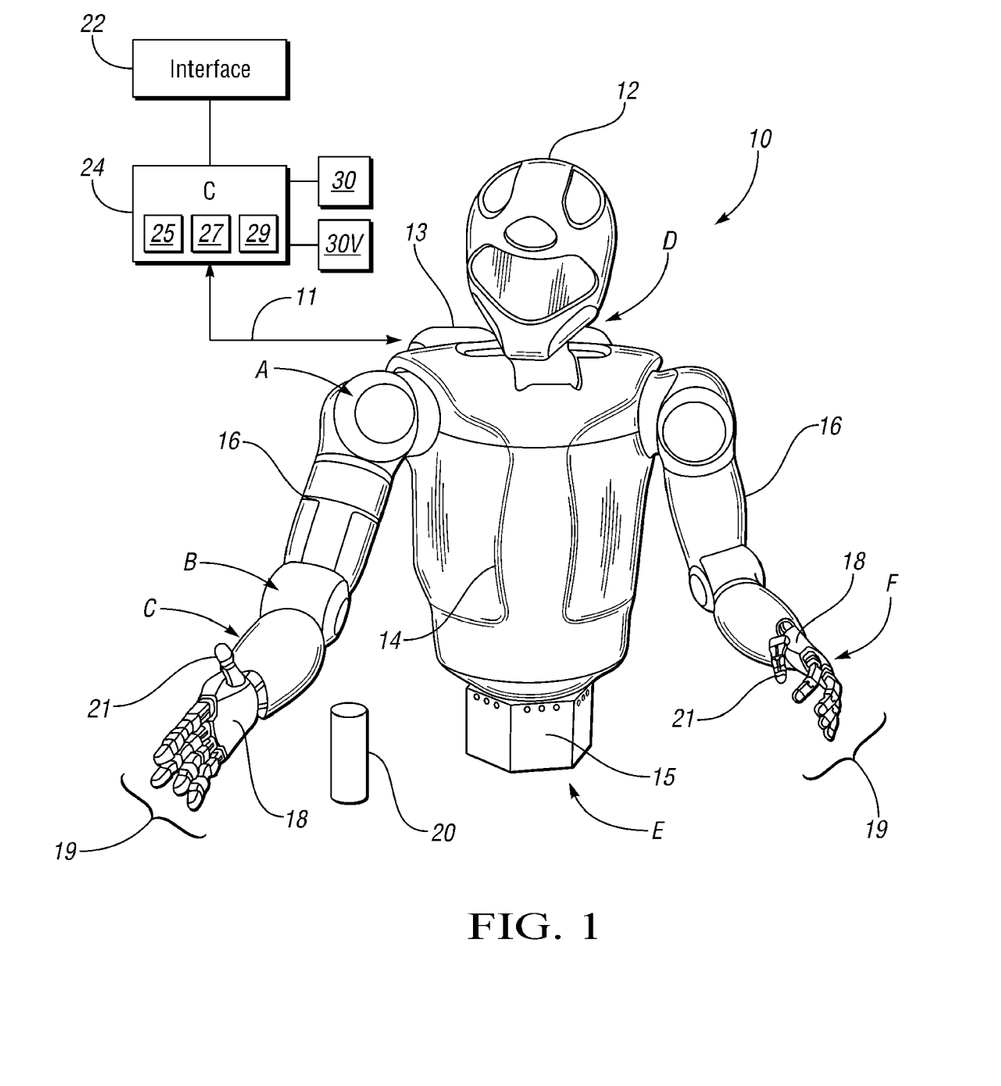
FIG. 1 is a schematic illustration of a robotic system having a visual perception module (VPM) in accordance with the present invention.

With reference to the drawings, wherein like reference numbers refer to the same or similar components throughout the several views, FIG. 1 shows a robotic system that includes a dexterous humanoid robot 10, which in turn is controlled via a distributed control system or controller (C) 24. The robot 10 is adapted to perform one or more automated or autonomous tasks with multiple degrees of freedom (DOF). According to one embodiment, the robot 10 is configured with a plurality of independently and interdependently-moveable robotic joints, such as but not limited to a shoulder joint, the position of which is generally indicated by arrow A, an elbow joint (arrow B), a wrist joint (arrow C), a neck joint (arrow D), and a waist joint (arrow E), as well as the various finger joints (arrow F) positioned between the phalanges of each robotic finger 19.

Each robotic joint may have one or more DOF. For example, certain joints such as the shoulder joint (arrow A), elbow joint (arrow B), and wrist joint (arrow C) may have at least two DOF in the form of pitch and roll. Likewise, the neck joint (arrow D) may have at least three DOF, while the waist (arrow E) may have one or more DOF. Depending on task complexity, the robot 10 may move with over 42 DOF. Each robotic joint contains and is internally-driven by one or more actuators, e.g., joint motors, linear actuators, series elastic actuators, other rotary actuators, and the like.

The humanoid robot 10 may include a head 12, torso 14, waist 15, arms 16, hands 18, fingers 19, and thumbs 21, with the various joints noted above being disposed within or therebetween. The robot 10 may also include a task-suitable fixture or base (not shown) such as legs, treads, or another moveable or fixed base depending on the particular application or intended use of the robot. A power supply 13 may be integrally mounted to the robot 10, e.g., a rechargeable battery pack carried or worn on the back of the torso 14 or another suitable energy supply, or may be external to the robot and connected via electrical cables, to provide sufficient electrical energy to the controller and actuators of the various joints and other integrated system components.

The distributed controller 24 provides precise motion and systems control of the humanoid robot 10, i.e., over the various joints and other integrated system components such as relays, modules, internal or external circuit components, etc., including control over the fine and gross movements needed for manipulating a work piece, tool, or other object 20 that may be grasped by the fingers 19 and thumb 21 of one or more hands 18. The controller 24 is able to independently control each robotic joint in isolation from the other joints, as well as interdependently control a number of the joints to fully coordinate the actions of the multiple joints in performing a relatively complex work task.

The controller 24 may include multiple digital computers or data processing devices each having one or more microprocessors or central processing units (CPU), read only memory (ROM), random access memory (RAM), electrically-programmable read only memory (EPROM), a high-speed clock, analog-to-digital (A/D) circuitry, digital-to-analog (D/A) circuitry, and any required input/output (I/O) circuitry and devices, as well as signal conditioning and buffer electronics. Individual control algorithms resident in the controller 24 or readily accessible thereby may be stored in ROM and automatically executed at one or more different control levels to provide the respective control functionality.

The controller 24 may communicate across multiple communication nodes or connection points, and over multiple high-speed communication networks, e.g., Ethernet, multi-point low-voltage differential signaling (M-LVDS) busses, backplanes, and the like. The nodes may be embodied as the various modems, hubs, bridges, computers, data routers, workstations, servers, etc. controlling the flow of information within the robotic system.

Still referring to FIG. 1, the controller 24 is "distributed" in the sense that command-level control may be provided at a top or macro-level, with joint coordination control provided at a lower or intermediate-level. The intermediate-level controller in turn controls each joint involved in the control of a particular task or motion, and does so via direct communication with multiple low-level controllers.

Therefore, the controller 24 may include a command-level controller referred to herein as a system commander 25, and a real-time joint and system coordination controller referred to hereinafter as the brainstem 27. The controller 24 may also includes multiple embedded joint-level controllers 29 which, as the description implies, are each embedded within the structure of the robot 10, e.g., within the arms 16, in close proximity to the particular joint or other integrated system component being controlled thereby. Joint-level controllers 29 may be configured as one or more printed circuit board assemblies (PCBA) providing joint sensing, signal processing, and immediate actuator control.

Still referring to FIG. 1, control data and the feedback data, represented by double-arrow 11, may be exchanged between the humanoid robot 10 and the various levels of the controller 24, including a visual perception module (VPM) 30V as described below, in order to ensure precise complex motion and systems control of the robot. The controller 24 may include a user interface 22, e.g., a control panel, display screen, and/or other human-machine interface (HMI) device. User interface 22 may be configured to separately facilitate access to the humanoid robot 10 at the operational and the programming levels.

Within the scope of the present invention, the controller 24 may also include application modules 30. Each application module is configured to control a certain environmental or peripheral sensory application. In one embodiment, one of the command modules is configured as the VPM 30V, which provides the robot 10 with flexible visual perception capability supporting dexterous tasks. Such environmental perception/sensing capability or other related control functionality of the VPM 30V may be relayed through the various control levels of the controller 24 via the multiple high-speed networks described above.

Figure 2:
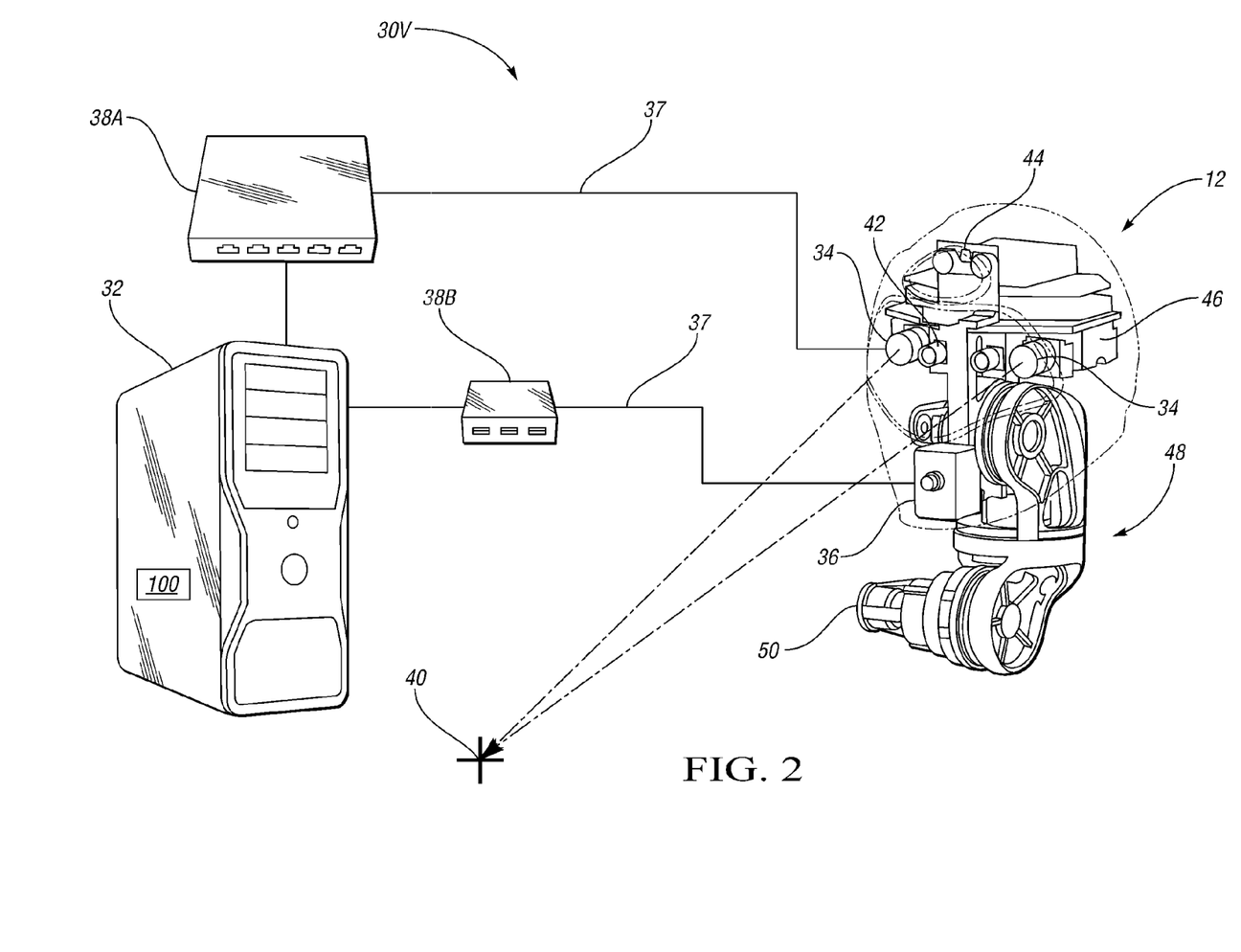
FIG. 2 is a schematic illustration of the VPM shown in FIG. 1.

Referring to FIG. 2, the VPM 30V includes hardware, software, and sensors all linked to the robot 10 of FIG. 1. The VPM 30V enables vision-based operation of the robot 10 without the need for application-specific engineered lighting systems to illuminate the work area and/or any object(s) being acted upon by the robot. The VPM 30V provides object or feature location and guidance under conditions of challenging light, low contrast surface conditions, etc., without requiring fixturing or other infrastructure in the conventional manner.

According to one embodiment, the VPM 30V may include a processor or host machine 32, software in the form of an image processing algorithm 100, and sensors in the form of optical sensors or cameras 34 and a positional data extraction device(s), e.g., a range-finding sensor or infrared (IR) range imager 36 and/or laser projectors 42. According to one embodiment, the cameras 34 may be configured as high-resolution cameras of at least approximately five mega-pixels, although different cameras providing other suitable resolutions may also be used to achieve a similar result.

The host machine 32 may be configured as a digital computer having one or more microprocessors or central processing units (CPU), read only memory (ROM), random access memory (RAM), electrically-programmable read only memory (EPROM), a high-speed clock, analog-to-digital (A/D) circuitry, digital-to-analog (D/A) circuitry, and any required input/output (I/O) circuitry and devices, as well as signal conditioning and buffer electronics. The algorithm 100 may be stored in ROM aboard the host machine 32, or in another location accessible by the host machine, and automatically executed thereby to provide the respective visual perception functionality as set forth below.

The host machine 32 may be linked to the cameras 34 and IR range imager 36 via a high-speed connection 37 and respective hubs 38A, 38B. In one embodiment, the hub 38A may be configured as an Ethernet hub, while the hub 38B may be configured as a universal serial bus (USB) hub, although other hub configurations may also be used without departing from the intended scope of the invention. The cameras 34, the IR range imager 36, and the laser projectors 42 may be contained or encapsulated within the head 12 of the robot 10, with a pair of the cameras being separated by a calibrated distance to provide three-dimensional (3D) stereo vision of an object 20 (see FIG. 1) positioned at a focal point 40 in the robot's field of view.

The VPM 30V may also include an auxiliary lighting device 44 having the functionality described below. The projectors 42 and the lighting device 44 may be mounted with respect to a frame 46 that is likewise encapsulated within the head 12 of the robot 10 shown in FIG. 1. Such a frame 46 may also be configured to support the IR range imager 36 and each of the cameras 34. In this manner, data processing is conducted by the host machine 32 while the cameras 34, IR range imager 36, lighting device 44, and laser projectors 42 are securely positioned within the head 12.

Still referring to FIG. 2, the VPM 30V includes a 4-axis redundant gaze control unit (GCU) 48, including an axis provided by the waist 15 of FIG. 1. The head 12 is moveable with at least two DOF, i.e., rotation and elevation. One or more actuators 50, e.g., joint motors, series elastic actuators, rotary actuators, and/or linear actuators, allow the head 12 to rotate or tilt as needed to adjust the focal point 40. Precise motion control over the gaze is provided via the controller 24 of FIG. 1 and the GCU 48 of FIG. 2, with one joint-level controller 19 being embedded in the neck joint of the robot 10 of FIG. 1 and dedicated to providing sensor and data processing for at least one DOF of the joint.

The VPM 30V of FIG. 2 used in conjunction with the 42+ DOF humanoid robot 10 shown in FIG. 1 provides automation capabilities that may significantly reduce the reliance on fixturing and mechanical structure, as noted above. This capability may enable automated task execution with a set of little or no more infrastructure requirements than would a completely manual process. Guiding by perception rather than fixturing may allow the mobility of the robot to have substantially relaxed requirements for repeatability and accuracy, and may exploit the task-related guidance perception capability. The flexible robot perception capability provided by the VPM 30V applies a strategy that includes highly-flexible robots/end-effectors, feature perception, and integration with human users or operators performing manual work tasks. A visual perception system that is flexible across an array of automated applications may facilitate the assignment of the robot 10 to a particular set of tasks as required by the production mix and business needs.

Figure 3:
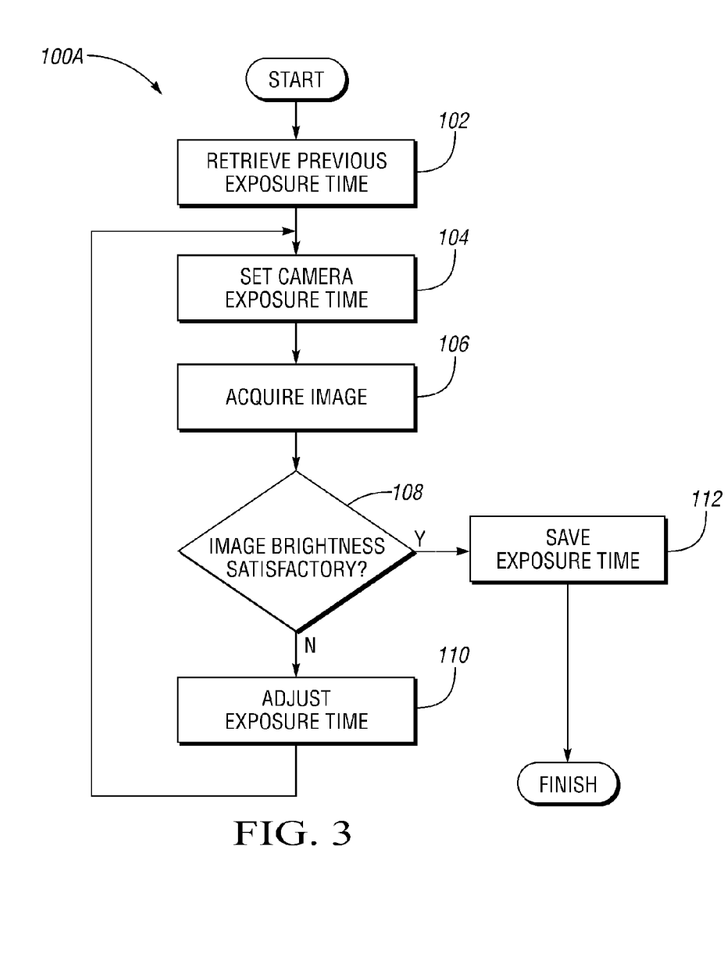
FIG. 3 is a graphical flow chart describing a portion of an algorithm of the VPM shown in FIG. 2.

Referring to FIG. 3 in conjunction with the structure of FIGS. 1 and 2, the algorithm 100 of FIG. 2 includes a portion or algorithm 100A that attempts to acquire properly-exposed images from one or more cameras 34 for use in vision tasks. Algorithm 100A starts at step 102, wherein exposure times are obtained for use by the cameras 34 when acquiring images. In one embodiment, the obtained exposure time values may be exposure times used previously by the same algorithm 100A, as these values will produce properly-exposed images if lighting conditions have not changed.

The algorithm 100A then proceeds to step 104, where image exposure times are set for the cameras 34. Once set, the algorithm 100A proceeds to step 106, wherein images of the object 20, e.g., a work piece, tool, or other object being acted upon by the robot 10, are acquired by the VPM 30V using the cameras 34.

Timing of image acquisition may be controlled either by software or by an external hardware signal. If multiple cameras are used, the synchronization signal is sent to all cameras simultaneously. This allows accurate stereo vision calculations to be performed since the acquisition of the two images from both stereo cameras was triggered at the same instant in time. The synchronization signal may also trigger the recording of other information, such as the position of the robot 10 in either joint or Cartesian space. Alternatively, the image acquisition process may record the times when the images are taken, for example so that subsequent processing can compensate for robot motion between acquisitions of individual images.

The images are temporarily recorded in memory of the host machine 32. Image data preservation exposure control may be provided by automatically processing and analyzing the upper and lower intensity components of the acquired images. The algorithm 100A then proceeds to step 108.

At step 108, image brightness may be computed using the host machine 32. Image brightness may be calculated based on a single camera 34, or it may be based on simultaneous images from two or more cameras. In the latter case, the measured brightness may be calculated in all images individually, or it may be a mathematical combination (such as an average) of the brightness of the individual images. If the brightness is determined to be satisfactory for the task at hand, then the algorithm 100A proceeds to step 112, otherwise it proceeds to step 110, wherein exposure times are adjusted as needed.

Within the scope of the present invention, the nature of the image-brightness calculation noted above is task-dependent. For example, when processing dark features on a dark image, the brightness of the image may be measured by taking a histogram of the intensity of the pixels in the whole image, ignoring a fixed percentage of the darkest pixels, for example the darkest 1 percent, and then looking at the darkest pixel remaining If that pixel's intensity value is within an acceptable range, then the whole image may be deemed acceptable. Similar calculations can be performed for white-on-white processing, except that the brightness measure would be obtained by ignoring the brightest 1 percent of the pixels in the image.

If at step 106 it is determined that the image brightness is not acceptable, then the algorithm 100A proceeds to step 110, wherein the exposure time is adjusted, e.g., new exposure times are computed. The exposure times may be increased or decreased as needed, depending on whether the image is too dark or too bright, respectively. This computation may take into account the amount by which the images are too bright or too dark, the distribution of pixel intensities, and camera-imposed limits on the exposure times.

If more than one camera 34 is used, the exposure times for the cameras may be adjusted individually, based on the brightness of the images obtained by that camera, or they may be kept in a fixed relationship to one another. In the latter case, the exposure times can be based on a single camera 34 or several such cameras, as in step 108. Keeping the exposure times in fixed relationships compensates for different camera gain settings, iris openings, or other factors that influence image brightness. The relationship between camera exposure times typically may be expressed as a ratio of the exposure times, with the ratio being obtained using a calibration procedure that measures the relative brightness of the images obtained when the cameras 34 are pointed at identical scenes. If the cameras 34 are believed to be identical, then that ratio can be assumed to be equal to one, so that all cameras have identical exposure times.

Since lighting conditions can frequently be mostly stable over the timeframe in which several images are acquired by the cameras 34, the last converged exposure time may be fed forward to the subsequent image acquisition cycle at step 112. Exposure feed-forwarding provides an optimum initial value for the exposure time, and increases the probability that only one additional image acquisition cycle will be needed to acquire a subsequent useable image.

Figure 4:
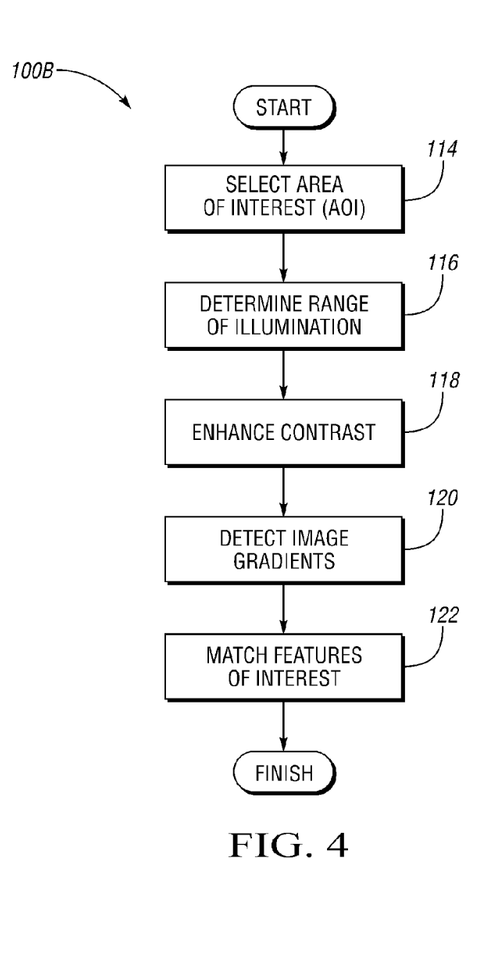
FIG. 4 is a graphical flow chart describing another portion of an algorithm of the VPM shown in FIG. 2.

Referring to FIG. 4, the algorithm 100 of FIG. 2 may also include a portion or algorithm 100B for analyzing substantially black-on-black images for the purpose of locating certain features on monochromatic objects, e.g., a black indenture on a black work piece. This capability relies on the use of the aforementioned image data preservation exposure control, i.e., algorithm 100A of FIG. 3, to ensure that image data is not lost due to excessively short or long exposure times.

Algorithm 100B begins with step 114, wherein a maximum threshold area of interest is selected in a larger image, i.e., the image collected at step 102 of algorithm 100A, for further evaluation. At step 116, the selected area is automatically evaluated using a histogram to thereby determine the extent of the range of illumination of the area of interest. The algorithm 100B then proceeds to step 118.

At step 118, the evaluated range may be proportionally expanded and applied to the test area or area of interest to enhance contrast. A histogram of the intensity levels in the test area are evaluated based on the range and distribution of intensities. Based on the upper and lower limits of the distribution, which frequently is a subset of the available dynamic range of the image, the range of the distribution may be expanded by linearly adding intensity offsets to the initial values, such that the distribution flattens and fills the entire dynamic range of available intensity values. This technique effectively flattens and enhances contrast for the conditions of the test area where the intensity is mostly dark or mostly light.

The algorithm 100B then proceeds to step 120, wherein image gradients are detected such that features may now be discriminated in the image. Other image processing steps can also be performed at this step to discard selected image data that may interfere with operations in subsequent steps. These operations may include but are not limited to "thresholding" the image in a certain range of values and "blob processing" the area of interest based on the shapes of the threshold areas, as the term "blob processing" is understood in the art.

At step 122, this may include, but is not limited to operations that now operate on the simplified image that was the product of the previous processing in steps 118 and 120. Features of interest appearing in the simplified image may be matched based on contour models or other suitable means. In this way, the robustness and speed of the feature recognition and/or other operations are significantly facilitated by the simplifications performed in the previous steps.

Figure 5:
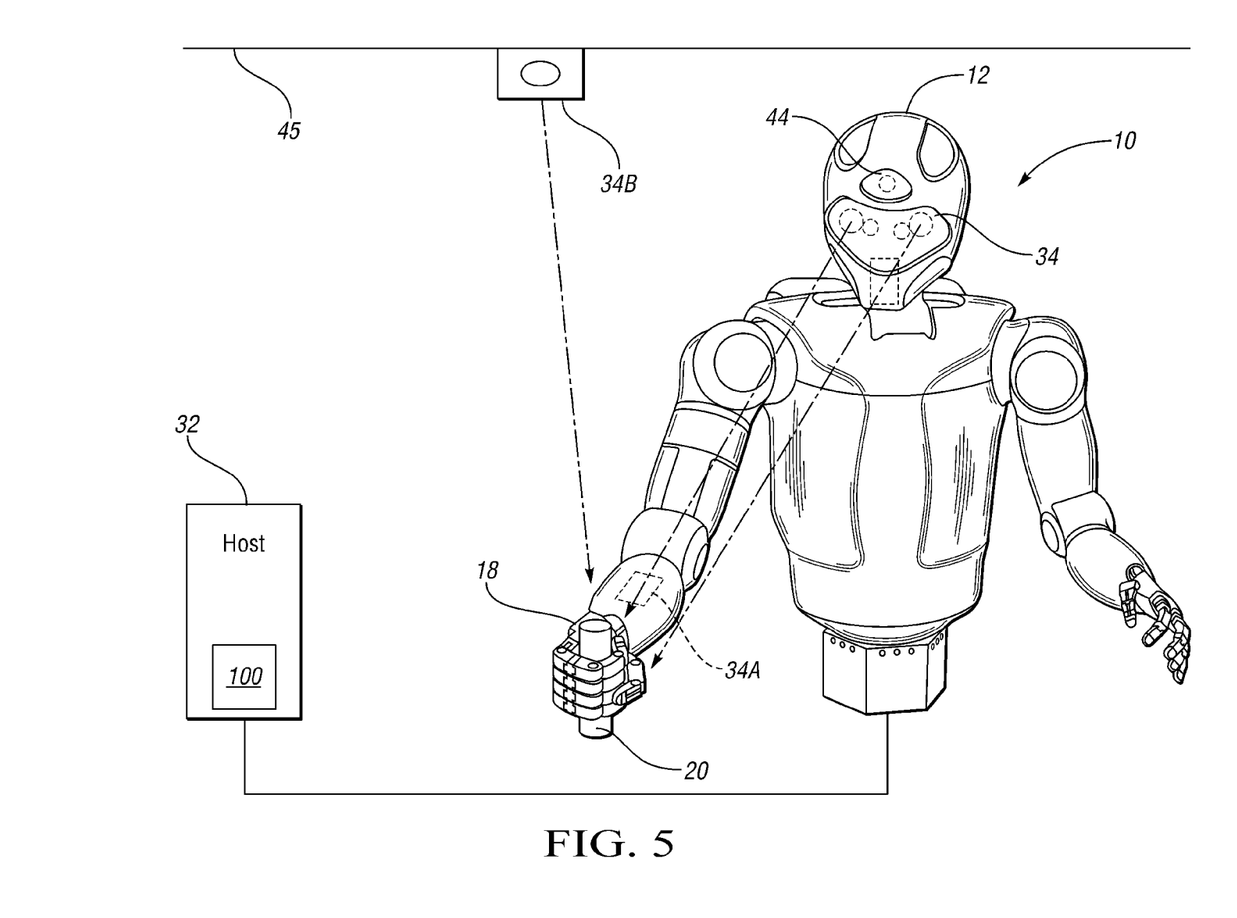
FIG. 5 is a schematic illustration of the humanoid robot of FIG. 1 viewing an object through multiple views or angles.

Referring to FIG. 5, the robot 10 is shown holding an object 20, e.g., a torque sensing fastener driver or other work tool, in a hand 18. Most of the sensors of the VPM 30V (see FIG. 2) are encapsulated within the head 12 of the robot 10, as noted above. Additional cameras 34A and 34B may be respectively mounted to a forearm, palm, or chest area of the robot 10 and to an overhead structure 45, e.g., a ceiling, wall, stanchion, or other suitably stable overhead surface or location within a robotic work cell or envelope. The camera 34B may be used, for example, to determine conveyor status or global scene recognition. Overhead cameras provide a coarse localization of objects of interest or the status of the process, such as but not limited to that of any desired parts.

Within the scope of the invention, automatic integration is provided of different views of a task conducted with respect to the object 20 in order to provide an optimal point of view. One of the more important views to have is the point of view of a palm of hand 18 facing the object 20. This particular view allows more precise centering in the approach of the hand 18 to the grasp before contact is made with the object 20, and before any tactile senses of the robot 10 are usable. Implicit in these techniques is the co-registration of the ranges and fields of view of the various sensors.

As will be recognized by those of ordinary skill in the art, processing of vast amounts of array data is not only time consuming, but can also lead to task-irrelevant or false matches. Spatial attention mechanisms, on the other hand, can direct limited computational resources to areas of the search space that are task relevant and also less likely to yield false matches. As used herein, the term spatial attention mechanisms may refer to range, epipolar/stereo geometry, and/or field of view-cueing techniques.

Referring again to FIG. 2, range cueing utilizes relatively fast, low-resolution sensors to direct slower, higher-resolution sensors to areas of a search space which are task-relevant or that contain potential matches. In one embodiment, a fast, low-resolution sensor in the form of the IR range imager 36 may be used to provide time-of-flight (TOF) data that cues the faster, high-resolution stereo cameras, i.e., the cameras 34, which may in turn cue the placement of structured light as needed from the auxiliary area lighting device 44.

An example of range cueing based on task-relevancy would be to ignore areas that are outside the work envelope of the robot 10 and segment the subsequent high resolution identification of a feature as that location in the range image is translated into the field of view of the hi-res cameras 34. An example of range cueing based on potential matches would be to ignore volumes that are occluded by other objects that are at a closer range to the sensors.

In addition, the IR range imager 36 and the cameras 34 offer complementary features, such as the ability of the IR range imager to localize featureless surfaces. This can be further refined by structured light from the auxiliary lighting device 44, which is a task which the stereo cameras 34 cannot perform alone, and the ability of stereo cameras 34 to handle large amounts of IR illumination, e.g., conditions where the task area is illuminated with direct sunlight which overpowers the structured IR light source from the IR range imager resulting in the loss of the range image output from the sensor.

Epipolar cueing applies triangulation constraints to direct searches from the field of view of one camera 34 to only a handful of rows within its sister camera, i.e., the other camera 34. The width of the search rows may be further limited by knowing the approximate depth, which can be provided by the IR range imager 36, or the size of the object of interest. Field of view cueing refers to locating smaller features or objects based on their relative position to larger features or objects.

For example, locating the tip of a cable, or the locator hole of a component, across the entire field of view, may be computationally expensive and prone to false matches. However, searching for the same cable tip or locator after using an offset from a cable toggle or component edge may lead to faster and potentially more reliable matches. Finding a small feature or object in one camera's field of view can then direct stereo triangulation based on approximate depth, which can be provided by the IR range imager 36, or size of the object of interest. Implicit in these cueing techniques is the co-registration of sensors' ranges and fields of view.

Figures 6, 7:
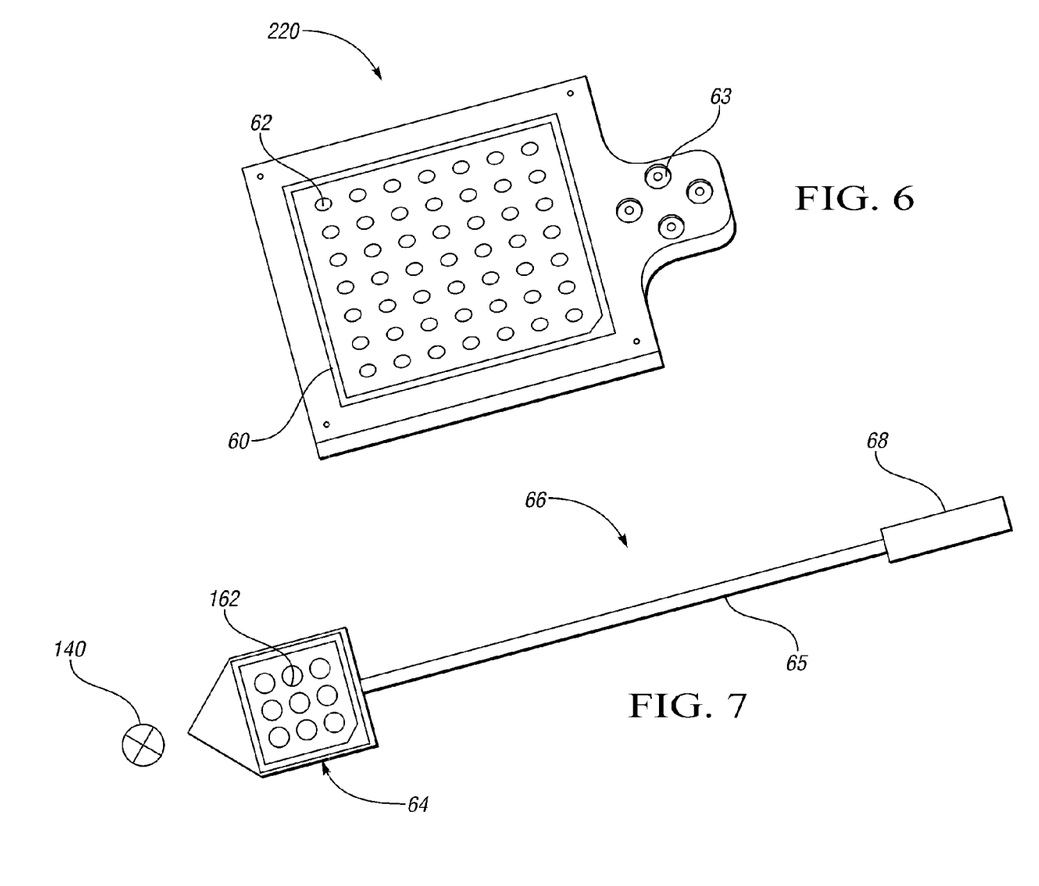
FIG. 6 is a schematic perspective view illustration of a calibration artifact or object that can be mounted to a hand of the robot shown in FIG. 1.
FIG. 7 is a schematic perspective view illustration of a point/pose teaching pointer tool usable for vision-based task training of the robot of FIG. 1.

Referring to FIG. 6 in conjunction with FIG. 5, eye-hand calibration may be provided by using an end-effector-mounted object 220 having a geometric pattern 60 to extract the 3D location and 6 DOF pose of a hand 18 of the robot 10. This calibration object 220, preferably an object with easily discerned high-contrast markings 62 as shown in FIG. 6, may be fixed via mounting holes 63 to the center of an end-effector's grasp, i.e., a palm of a hand 18, or reliably held in the grasp of robot 10 with known dimensional repeatability. This allows instrumentation of the location of an end-effector positioned n the visual field of view of the VPM 30V.

The 3D location of the position and orientation (6 DOF pose) of object 220 with respect to the head 12 may be determined by the VPM 30V, preferably using high-resolution stereoscopic imaging techniques. To perform calibration, the robot 10 may be commanded to move the calibration object 220 to multiple locations in its field of view and to fix its gaze on the calibration object. At each location, joint angles measured by the robot's internal angle sensors may be recorded, as is the 6 DOF pose of the calibration object 220 in a coordinate frame fixed in head 12.

A calibration algorithm (not shown) may be executed to align the visual space of the robot 10 with the geometric movement space, preferably using a least-squares fit to match the predictions of a kinematic model of the eye-hand relationship to the various measured poses of the calibration object 220. Alternately, other error measures such as the sum of absolute value of error components instead of the sum of squares could be minimized. In one embodiment, the calibrated parameters may include zero offsets of the measured joint angles in a kinematic chain leading from the robot hand 18, up the arm 16 (see FIG. 1), and along the neck of the robot 10 to the frame 46 (see FIG. 2). After measuring a sufficient number of poses with sufficient accuracy, it is possible to also make fine adjustments to the kinematic models of the links of the robot. This technique exploits the meteorology capabilities of the VPM 30V and avoids the need for other auxiliary meteorology devices to perform or check the calibration.

Eye-hand calibration can be extended to both hands 18 and also extended to include coordination with externally-mounted cameras, such as the camera 34B. To extend calibration to the second hand, the calibration object is moved to the second hand and another set of data comprising joint angles and the corresponding visual measurement of the object pose is collected, again at multiple hand locations. The portions of the kinematic chain in common to the two hand-to-eye chains, namely the neck joints and any intervening links, may be calibrated by applying least squares minimization to the ensemble of measurements from both arms.

To calibrate the rest of the robot's kinematic chain, such as waist joint 15 or other lower extremities, the calibration object 220 may be placed in a known location on any link that is more topologically-distant from the head 12, such that the kinematic chain from the head to the calibration object includes the joint to be measured. If the topologically-distant link is within reach of the robot 10, the placement of the calibration object 220 on the link may be accomplished automatically by the robot, otherwise the intervention of a human operator may be necessary.

Finally, to calibrate any externally-mounted camera, e.g., camera 34B, the robot 10 may show the calibration object 220 to the externally-mounted camera(s), recording both the internally measured joint angles and the location of the calibration object as measured by the external camera. Comparison of the internally computed pose of the calibration object 220, using the previously calibrated eye-hand kinematic model, with the pose as measured by the external camera, e.g., 34B, reveals the 3D position and orientation of the external camera with respect to the robot 10. Measurements of multiple such poses may be resolved using least-squares to improve the accuracy of the calibration. In this manner, subsequent measurements from that camera of other objects or features of interest may be accurately interpreted in the robot's internal reference frame, facilitating accurate motion with respect to these, such as would be required to pick up or otherwise interact with such an object.

Referring to FIG. 7, a 3D and 6 DOF pose-teaching pointer tool 66 may enable "teaching" or "showing" the robot 10 various system locations and/or poses in the robot's field of view. This pointer tool 66 can be scaled to any practical size necessary that is compatible with the process at hand. The pointer tool 66 may include a pointer head 64 and a handle 68 connected via a connecting portion 65, e.g., a bar, rod, or other rigid extension. A series of visual tracking fiducial marks 162 are located on the head. Using the pointer tool 66 may enable fast and easy point teaching of various points and/or poses in Cartesian space without the need to enter the immediate work envelope of the robot 10. Once an operator points the pointer tool 66 to an area of interest, i.e., a point 140, an image is captured and processed as described above, and the center location and pose of the pointer head 64 is determined in a spatially-calibrated field of view of the cameras 34.

This location and pose may be mathematically transposed to a tip of the pointer tool 66 by a known offset based on the physical construction of the pointer head 64. It is this location and pose of where the pointer tool 66 is pointing that is returned to the controller 24 for further use as a "taught point" that the robotic system of FIG. 1 can use in subsequent operations. Continuous updates of the pointer location at high frame rates results in the capture of a path that may also be used to follow or otherwise describe geometry saved for future use by the robotic system. This exploits the meteorology capability of the flexible perception system to significantly facilitate the set-up and configuration of the system for new tasks.

Referring again to FIG. 2, an integrated structured light system may be provided via the auxiliary lighting device 44. Twin intersecting planes of laser light from the laser projectors 42 may be used to extract position information from an object 20 having relatively featureless surfaces and contours where conventional stereo disparity techniques are unusable. A range function may be supported by finding the center of the intersection of the two planes of light in both a right and a left image, and then applying binocular calibration and the intersecting lines of sight to the distinct feature location of the planar light intersection in order to determine the 3D location of the surface where the reflected light is observed.

3D scanning and instrumented surface model reconstruction may be accomplished by panning a laser light stripe across a surface with the 4-axis redundant GCU 48, recording stripe position with calibrated cameras and reconstructing an image model. The GCU 48 may also be used to gain multiple views of essentially the same scene. Evaluation of these different views can also provide an adaptive target gaze command for the alternative points of view. This enables active gaze control vision for the implementation of object disambiguation techniques, range calibration check vs. known camera position movement, and occlusion resolution by "try again" gaze control.

The location of an object 20 that a robot grasps in its end-effector, e.g., in a hand 18, is important to know if the end-effector is not capable of precisely fixturing the object in its grasp. One goal of a flexible end-effector is to at least control the object 20 without the object slipping from the initial point of grasp. This is a bit different from a fixture grasp since the precise location of the object 20 held in the grasp is not known. As objects in the form of tools are continually reused in the performance of certain work tasks, marks may be added to the visible areas of the object 20 to facilitate the reliable determination of the location or pose in the field of vision of the VPM 30V. These marks can be unique to each object 20, and can also be unique within each pose of the object to facilitate the generation of an approach path and grasp strategy for the found random location of the object within the work space.

Within the scope of the invention, high frame rate, high-resolution dual-camera tracking, i.e., tracking of the cameras 34 encapsulated within the head 12, is enabled by operating one of the cameras at a lower resolution and a higher frame rate than the other. The image from the first camera may be used to segment a desired search area in a field of view, and to provide a "coarse lock" onto the target's location for subsequent image updates and incremental changes of location in the field of view. The location of this target segmentation may be transferred into the image plane of the second high resolution camera for image processing by the host machine 32, including detailed analysis and location of smaller features in the same field of view.

This practice may allow for a more rapid and directed application of image analysis tasks at a higher resolution than would normally possible if the entire field of view were to be evaluated for the same task. The high-rate tracking can run asynchronously with respect to the high-precision image frame capture. Images may be time-stamped at the time of capture, and the results may be synchronized at the time of evaluation to enable responsive and robust object tracking with precise results. Sampling of Cartesian or joint position feedback can also be time-stamped such that the closest time-distance alignment of the image data can be attained. This technique can also be applied when one or more cameras 34 are triggered by a dedicated signal such that there is close coordination of image acquisition and the recorded time-stamp for that image and other data. This provides the most accurate synchronization of images and the robot's instantaneous position and other associated data.

The process of image segmentation by gray level value or by color refers to locating smaller features or objects based on the relative position of that feature or object to larger features or objects. For example, locating a tip of a screw across the entire field of view of the robot 10 can be computationally expensive and prone to false matches. However, searching for the same screw tip after using an offset from a yellow power drill/screwdriver for dark image regions, by way of example, leads to faster and potentially more reliable matches.

Furthermore, using the IR range imager 36 may provide a multi-spectral component that is not typically found in conventional machine vision systems, e.g., two surfaces may appear similar in the visible portion of the electromagnetic spectrum while being more clearly differentiable in the IR portion of the electromagnetic spectrum; heat and water content are two cases were IR imaging can help. Implicit in these cueing techniques is the calibration of a whitebalance point of a sensor. This calibration would change based on ambient lighting conditions, e.g., differing amounts of sunlight throughout the day, or different overhead lights used in different parts of a factory, and can be facilitated using a calibration artifact of known reflectance, e.g., a Macbeth color checker or other suitable calibration artifact.

Part of the flexibility of the VPM 30V shown in FIG. 2 requires that the visual perception capabilities of the VPM remain reliable under changing ambient lighting conditions. Strict conditions of structured or engineered lighting may not be practical for a robotic system providing many vision-based functions for a series of diverse complex assembly tasks. An adaptive thresholding technique is therefore provided that exploits partial knowledge of the conditions in the field of view, and then uses this information to extract the proper threshold(s) to be used in further segmenting the image for subsequent algorithm steps.

The VPM 30V locates areas of interest within the image for the objects to be segmented. These small areas are selected for their representative grayscale or color intensity values based on the evaluation of the dominant peak of area's the histogram. This information is then used to calculate the threshold level that will differentiate the object area with the background or other objects in the field of view.

The GCU 48 plays an important role in pointing the sensors and lighting devices in the direction of the desired field of view. The servo controlled "head" and "neck" components of the robot 10 can be directed under program control to specific predefined locations or to search and/or track features in the field of view as necessary for the task at hand. Auto-gaze functionality can also reduce the need to explicitly program the orientation and configuration of the head and neck axes, since interaction between features found and/or tracked in the field of view of the robot 10 can be used to direct the head and neck through the established kinematic calibration of the robot and the spatial frame of reference of VPM 30V.

Due to a less structured task environment of the robot 10, only an approximate location relationship may be assumed when initially searching for features or objects in the field of view. In the first segmentation of the search, an easy to find reference feature that is associated with detailed target features is located somewhere in the field of view. If not located, then a task error may be generated or the gaze commanded to change, and the search may be repeated on the new image(s). Based on the task at hand, the detailed features may be found or the gaze may be commanded such that the target features can be seen in a specific area of the field of view.

This may be useful in the instance when the target features are found, but are desired to be seen in the left side of the image, by way of example, such that other features can also be seen on the right side of the image such that a distance may be measured or an object can be simultaneously seen by both cameras 34 in stereo for further location or pose determination. This can be done in the progressive sequence in just a few images and gaze control commands or a high frame rate tracking of a moving target and continuous gaze tracking servo. The continuous gaze tracking servo of target features is important so that moving targets can stay in the field of view and/or structured or engineered lighting can also be reliably tracking the features of interest.

A truly flexible end-effector may have a plurality of jaws or fingers, e.g., the fingers 19, which may have multiple DOF as needed to perform a range of grasping tasks. These grasping components may be servo-controlled, actuated by linkage, or any combination of implementation techniques, as explained above. End-effector DOF angle or displacement relationships and position feedback devices should be properly calibrated to their actual mechanical absolute location.

The VPM 30V may be used to support this calibration function by observing the pose and movement of individual grasping components with respect to a non-moving reference on the end-effector structure. Alignment marks or grasping link components may be found in the image, and their geometric relationship may be determined visually while the end-effector is held in a favorable pose within the field of view.

In navigation and reaching alike, obstacle avoidance techniques may be used to avoid damage to the robot 10 and/or an object 20, as well as inadvertent contact with other objects or operators. Obstacle avoidance is a dynamic process because both ego-motion and external motion are possible. Whereas previous obstacle avoidance techniques focus on the immediate surroundings of the robot, the VPM 30V considers a network of interacting agents with sensors of different, possibly non-overlapping, domains. The robot 10, a static assembly cell camera, a human operator, and a parts delivery system or vehicle are examples of these agents.

Obstacle avoidance warnings from off-board processing could arrive at the robot 10 via the host machine 32 and cause it to reduce maximum trajectory speed, less momentum if a collision does happen, or change joint compliances, limit paths of travel, etc. Additionally, the host machine 32 could pass on present and intended paths of travel of the robot 10 in order to coordinate traffic for safety and/or efficiency reasons, e.g., by activation of an audible and/or visual signal for human safety or a queuing of part kits.

Underlying all machine vision-based tasks of the VPM 30V is radiometric calibration. Considerations include: removing the effect of dead pixels, removing the effect of dark currents, normalizing pixel response curves, compensation for vignetting, modeling thermal effects, etc. Previous calibration methods typically consider a sensor by itself, e.g., a single camera 34, but the present invention may also consider fusing information from complementary sensors, e.g., multiple cameras 34, 34A, 34B, the IR range imager 36, etc.

For example, if one camera 34 is suffering from thermal effects, pixel values could first be normalized based on a thermal model, and in the limit of extreme thermal effects, can be taken from its sister or assembly camera and processed to yield new algorithmic fault tolerance. Radiometric calibration would also yield linear response curves for the aforementioned dynamic exposure algorithm, which could greatly reduce, or possibly eliminate, the search time in hunting for a desired exposure. For example, without calibration, to get an image twice as bright might require 1.7 or 2.4 times the exposure time; after calibration, a new exposure time could be directly computed.

While the best modes for carrying out the invention have been described in detail, those familiar with the art to which this invention relates will recognize various alternative designs and embodiments for practicing the invention within the scope of the appended claims.

The invention claimed is:

1. A robotic system comprising:
   a humanoid robot having a plurality of robotic joints each being moveable using at least one actuator; and
   a distributed controller configured to control the movement of each of the robotic joints, wherein the controller includes a visual perception module (VPM) that is configured to visually identify and track an object in the field of view of the robot under predetermined threshold ambient lighting conditions;
   wherein the VPM includes:
      a plurality of optical devices each configured to collect an image of the object;
      at least one of a laser device and a range imaging device configured to detect positional information of the object; and a host machine configured to:
  process the image and the positional information to thereby visually identify and track the object;
  automatically adapt an exposure time of the optical devices to prevent feature data loss of the image under the threshold lighting conditions; and
  discriminate either of a black-on-black or a white-on-white feature of interest on the object by:
    automatically evaluating a small area of interest in the image;
    using a histogram to determine the extent of the range of illumination of the area of interest; and
    processing the range of illumination to thereby identify the features of interest.

2. The robotic system of claim 1, wherein the humanoid robot includes a moveable head encapsulating the optical devices, the laser device, and the range imaging device, further comprising a gaze control unit configured to control the moveable head through at least four axes of movement.

3. The robotic system of claim 1, wherein the optical devices include at least a pair of identically-configured high-resolution cameras configured to capture the image with at least approximately 5 megapixels.

4. The robotic system of claim 1, wherein the range imaging device is a short-range infrared (IR) time-of-flight (TOF) device.

5. The robotic system of claim 1, wherein the VPM is configured to train the humanoid robot with respect to a new automated task by showing the robot at least one of a work sequence and a work pose within a designated work envelope.

6. The robotic system of claim 1, wherein the plurality of optical devices includes at least additional camera, wherein the VPM is configured to integrate different views of the object using information from the at least one additional camera.

7. A visual perception module (VPM) configured to visually identify and track an object in the field of view of a humanoid robot under predetermined threshold ambient lighting conditions, the VPM comprising:
  a plurality of optical devices configured to collect an image of the object;
  a positional extraction device including at least one of a laser device and a range imaging device, wherein the positional extraction device is configured to extract positional data of the object; and
  a host machine configured to:
    process the image and positional data to thereby automatically adapt an exposure time of the optical devices, and to thereby prevent feature data loss of a captured image of an object under the threshold ambient lighting conditions; and
    discriminate either of a black-on-black or a white-on-white feature of interest on the object by automatically evaluating a small area of interest in the image, using a histogram to determine the extent of the range of illumination of the area of interest, and then processing the range of illumination using the host machine to thereby identify the features of interest.

8. The VPM of claim 7, wherein the humanoid robot includes a moveable head encapsulating the plurality of optical devices and the positional extraction device.

9. The VPM of claim 7, wherein the optical devices include at least a pair of identically-configured high-resolution cameras configured to capture the image with at least approximately 5 megapixels.

10. The VPM of claim 7, wherein the positional extraction device is a short-range infrared (IR) time-of-flight (TOF) device.

11. The VPM of claim 7, wherein the VPM is configured to train the humanoid robot with respect to a new automated task by showing the robot at least one of a work sequence and a work pose within a designated work envelope.

12. The VPM of claim 7, wherein the plurality of optical devices includes at least additional camera, wherein the VPM is configured to integrate different views of the object as the object is located off the robot using information from the at least one additional camera, and from a perspective of at least one of a palm, a forearm, and a chest area of the robot.

13. A method of identifying and tracking an object in the field of view of a humanoid robot under threshold lighting conditions, the method comprising:
  using a plurality of optical devices to collect an image of the object;
  using at least one of a laser device and a range imaging device to extract positional information of the object; and
  processing the image and positional information using a host machine of a visual perception module (VPM), including discriminating either a black-on-black or a white-on-white feature of interest on the object by:
    automatically evaluating a small area of interest in the image;
    using a histogram to determine the extent of the range of illumination of the area of interest; and
    processing the range of illumination using the host machine to thereby identify the features of interest;
  wherein the host machine is configured to automatically adapt an exposure time of the optical devices to thereby prevent feature data loss of the image under the threshold lighting conditions.

14. The method of claim 13, further comprising training the humanoid robot with respect to a new automated task by showing the robot at least one of a work sequence and a work pose within a designated work envelope.

15. The method of claim 13, wherein the humanoid robot includes a plurality of compliant joints each having a measurable joint angle, the method further comprising:
  positioning the object in a grasp and field of view of the humanoid robot;
  moving the humanoid robot and object through a series of poses;
  using the host machine to track the object as it moves through the series of poses, including measuring each of the joint angles; and
  recording the joint angles using the host machine; and
  using the recorded joint angles to thereby calibrate eye-hand coordination of the humanoid robot.

* * * * *